Aug. 21, 1956  R. I. VAN NICE  2,760,086
FLIP-FLOP ELEMENTS FOR CONTROL SYSTEMS
Filed June 24, 1955
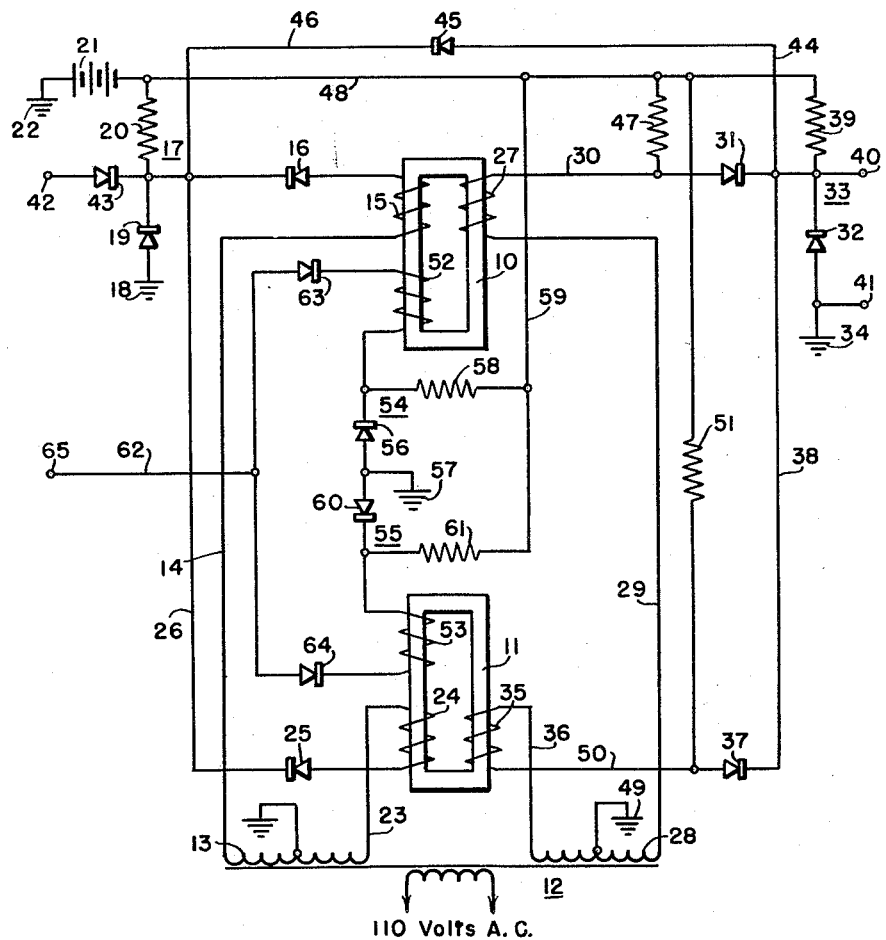
INVENTOR
Robert I. Van Nice
BY
ATTORNEY United States Patent Office
2,760,086
Patented Aug. 21, 1956

2,760,086

FLIP-FLOP ELEMENTS FOR CONTROL SYSTEMS

Robert I. Van Nice, Glenshaw, Pa., assignor to Westinghouse Electric Corporation, East Pittsburgh, Pa., a corporation of Pennsylvania Application June 24, 1955, Serial No. 517,780

4 Claims. (Cl. 307—88)

The invention relates, generally, to control systems and, more particularly, to flip-flop elements for control systems.

An object of the invention is to provide for interrupting an output from a flip-flop element of a control system by delivering a second signal which will function to interrupt the output irrespective of whether or not the signal which initiated the output from the flip-flop element is of short duration or continuous.

It is also an object of the invention to provide for delivering a signal to a flip-flop element of a control system which will interrupt the delivery of an output by the flip-flop element and prevent the delivery of an output as long as the interrupting signal is maintained, thereby to give a control of the functioning of the flip-flop element which facilitates its use.

Other objects of the invention will, in part, be obvious and will, in part, appear hereinafter.

The invention, accordingly, comprises the features of construction, combination of elements and arrangement of parts which will be exemplified in the system hereinafter set forth, and the scope of the application of which will be indicated in the claims.

For a fuller understanding of the nature and objects of the invention, reference should be had to the following detailed description taken in connection with the accompanying schematic diagram, the single figure of which is a circuit diagram of a flip-flop element of a control system embodying the features of the invention.

Referring now to the drawing, the flip-flop element for a control system is provided with two cores 10 and 11, each of which carries a plurality of coils utilized for driving the cores to positive and negative saturation alternately. In addition, the coils are provided with resetting and gating circuits so connected to a source of power such as a transformer 12 that the required circuits are established for effecting this positive and negative saturation of the cores alternately.

A number of non-linear devices are employed with the circuits to be described and traced hereinafter. The non-linear devices are so disposed in relationship to the circuits that they permit the flow of a predetermined magnetizing current to the coils or windings on the core members without any voltage drop and they also protect the circuits and apparatus from excessive current flow. Further as the description proceeds and the circuits are traced it will seem that the electric currents flow through the rectifiers or diodes in the backward or reverse direction, however, what actually happens is that there is a reduction in the electric current flow in the forward direction. The reduction in current flow may be predetermined by design to effect the performance of functions required from the control system of which the flip-flop element is a part.

In order to explain this embodiment of the flip-flop element for a control system embodying the inventive features, the circuits will now be traced and the functioning of the invention will be revealed as the specification proceeds.

The reset circuit for core 10 extends from one terminal of the secondary winding 13 of the transformer 12 through conductor 14, the reset coil 15 of the core 10, the rectifier 16 through a non-linear device shown generally at 17, to the ground at 18. In a normal operation of the flip-flop element, the coil 15 will drive the core 10 to negative saturation.

The non-linear device 17 comprises a rectifier 19 connected to the ground 18, a resistor 20 connected to the negative pole of the battery 21. The positive pole of the battery is connected to ground at 22.

Non-linear devices of this kind are well known in the art and need not be described in greater detail. It is sufficient to say that for small currents they offer low resistance to the flow of current and as the current increases the build-up of resistance is sufficient to protect the elements of the circuit from excessive current flow.

A reset circuit for the core 11 may be traced from the other terminal of the secondary winding 13 of the transformer 12 through conductor 23, reset coil 24, rectifier 25, conductor 26, rectifier 19 of the non-linear device 17, to ground at 18. This reset coil 24 is so connected that on the second half cycle it will drive the core 11 to negative saturation.

In the operation of the circuit when on one or the first half cycle, the resetting circuit for core 10 drives the core to negative saturation, on the second half cycle of current, the coil 24 will drive the core 11 to negative saturation. Thus we have two resetting circuits for the cores 10 and 11 which drive their respective cores to negative saturation alternately.

As pointed out hereinbefore, the cores 10 and 11 have gating circuits. The gating circuits for the coil 27 of the core 10 extends from one terminal of the secondary winding 28 of the transformer 12 through conductor 29, the gating coil 27, conductor 30, rectifier 31, through the rectifier 32 of the non-linear device shown generally at 33, to ground at 34.

As illustrated, the gating coil 35 on the core 11 is connected to the opposite terminal of the secondary winding 28 of the transformer 12. The gating circuit may be traced from the transformer through conductor 36, gating coil 35, rectifier 37, conductor 38, through the rectifier 32 of the non-linear device 33, to ground at 34.

It will be obvious from the gating circuits traced that when the core 10 is driven to positive saturation on one half cycle, the core 11 will be driven to positive saturation on the following half cycle.

The non-linear device shown generally at 33 comprises the resistor 39, the rectifier 32 connected to ground at 34, and to the negative terminal of the battery 21. As shown, the flip-flop circuit element is provided with output terminals 40 and 41 from which an output may be delivered as described hereinafter to perform some useful function in a control system. The voltage of the output will depend on the design of the flip-flop circuit element.

The flip-flop circuit element thus far described includes a transformer 12, two cores 10 and 11, reset circuits and gating circuits for each core, and output terminals. Therefore, when the transformer 12 is energized, the cores 10 and 11 will be driven to positive and negative saturation alternately. Assuming now that on the first half cycle the core 10 is driven to negative saturation, then the core 11 will be driven to positive saturation. On the next half cycle, the gating circuit for the coil 27 will overcome the negative saturation and drive the core 10 to positive saturation, while the reset circuit for the coil 24 on the core 11 will overcome the positive energization of the core and drive it to negative saturation. The flip-flop circuit element will thus continue to alternate the saturations of the cores 10 and 11 until they are interrupted in a manner to be described hereinafter.

A circuit is provided through which a signal may be delivered to the flip-flop element. This circuit extends from a terminal 42, through the rectifier 43, the non-linear device 17, to the rectifiers 16 and 25. The signal delivered will usually be direct current and of a magnitude greater than the voltage applied across the reset coils 15 and 24 during a reset cycle. Therefore, when a signal is delivered through the terminal 42, it will block the flow of current through the reset coils 15 and 24.

Assuming now that the core 10 has been driven to positive saturation by the current flowing in the gating coil 27, and that the signal to the terminal 42 is applied at that instant, then the result is that the core 10 remains positively saturated during the following half cycle which would normally be a resetting half cycle for the core 10. On the next half cycle which is a gating half cycle for the core 10, the current delivered from the secondary winding 28 of the transformer 12 will not be used up in driving the core 10 to positive saturation, and will build up a voltage across the output terminals 40 and 41.

During the gating half cycle for the core 10 that produces a voltage across the terminals 40 and 41, a resetting half cycle should occur for the coil 24. A signal is now received through the terminal 42, rectifier 43, non-linear device 17, and conductor 28, to the rectifier 25. The flow of current through the resetting coil in a direction to drive the core 11 to negative saturation is blocked. Therefore, the core remains positively saturated, and on the following half cycle the current delivered from the secondary winding 28 of the transformer 12 will not be utilized in overcoming the negative saturation of the core 11, and will build up a voltage across the terminals 40 and 41 through the gating circuit already traced.

Therefore, when the signal delivered through the terminal 42 is applied, the cores 10 and 11 will alternately produce a voltage across the terminals 40 and 41, which voltage will be maintained as long as the signal delivered at 42 continues. Whether or not such an output voltage across terminals 40 and 41 continues during the period of reception of the signal will be determined by the use to which the flip-flop circuit element is to be applied.

In order to provide for maintaining an output voltage across the terminals 40 and 41 after the signal delivered at 42 is discontinued, a feedback circuit is provided. This feedback circuit extends from the terminal 40, through conductor 44, rectifier 45, conductor 46, to the rectifiers 16 and 25. This feedback circuit will block the flow of current from the secondary winding 13 of the transformer 12 through the resetting coils 15 and 24 since the output voltage is by design always greater than the resetting voltage. When this feedback circuit is provided, the gating circuits for the coils 27 and 35 will maintain an output voltage across the terminals 40 and 41 irrespective of whether or not a signal is being received through the terminal 42.

It has been found that even with the feedback circuits described hereinbefore, that due to leakage of rectifiers and the fact that a perfect hysteresis loop for the cores 10 and 11 is never obtained, that the flux in the cores 10 and 11 will decay rapidly. Generally, the positive saturation of the cores even with the feedback circuits will not last more than about 20 seconds after the signal received at 42 is discontinued.

When the positive saturation of the cores 10 and 11 disappears, the flip-flop circuit element can no longer deliver an output. In other words, it no longer stores a signal. Thus, the storing of a signal or the memory of the circuit flip-flop element will only last until the positive flux in the cores decays through this well known process.

In order to store signals for any predetermined length of time, circuits are provided for maintaining the positive saturation of the cores 10 and 11 after an output has been built up across the terminals 40 and 41 through the positive saturation of the cores 10 and 11. The circuit for maintaining the positive saturation of the core 10 may be traced from one terminal of the secondary winding 28 of the transformer 12, through conductor 29, the gating coil 27, conductor 30, resistor 47, conductor 48, battery 21, to the ground at 22, back to the ground 49 of the transformer 12. The circuit for maintaining the positive saturation of the core 11 extends from the other terminal of the winding 28 of the transformer 12, through conductor 36, the gating coil 35, conductor 50, resistor 51, conductor 48, battery 21, to ground at 22, and back through the ground 49 of the transformer 28.

It has been found that the resistors 47 and 51 may be designed to give the correct current flow for maintaining the cores positively saturated for days.

In a flip-flop circuit element in which the transformer voltage was 110 and the resistors 47 and 51 had a resistance value of 220,000 ohms a signal was stored for days. In order to meet some applications of the flip-flop circuit element, it may be desirable to interrupt the output from the terminals 40 and 41 even when a signal is being supplied to the terminal 42. In cases where the flip-flop circuit element is applied in the control of automatic machines, the interruption of the output momentarily may become highly desirable.

In order to give an operator control of the flip-flop circuit element so that he may interrupt the output from the terminals 40 and 41 at will, third coils 52 and 53 are provided on the cores 10 and 11, respectively. These coils will be so designed and supplied with adequate current to effect the driving of the cores 10 and 11 to negative saturation irrespective of the magnetic conditions developed by the other coils on the cores. The current for energizing the coils 52 and 53 will be supplied from an independent power source.

In this embodiment of the invention, a terminal 65 is provided in conjunction with the flip-flop system for delivering what may be called a resetting signal.

As shown, the signal circuits for the coils 52 and 53 are provided with non-linear devices shown generally at 54 and 55, respectively. The non-linear device for the coil 52 comprises a rectifier 56 grounded at 57 and connected through a resistor 58, conductors 59 and 48, through the battery 21, to ground at 22. The non-linear device 55 for the coil 53 comprises a rectifier 60 also grounded at 57 and connected through a resistor 61, conductors 59 and 48, through battery 21, to ground at 22.

When a signal is applied at the terminal 65, the signalling circuit extends through conductor 62, rectifier 63, coil 52, on core 10 through the non-linear device 54, to the ground at 57. The signal delivered at 65 will be of great enough magnitude to drive the core 10 to negative saturation. The signal applied at the terminal 65 will also flow through the conductor 62, rectifier 64, coil 53, the non-linear device 55, to ground at 57. The signal will drive the core 11 to negative saturation.

Therefore, as long as the signal delivered at 65 continues, the cores 10 and 11 will be driven to negative saturation and no output will appear across the terminals 40 and 41. In this manner, the functioning of the flip-flop circuit element may be interrupted for any predetermined time.

As soon as the delivery of the signal through the terminal 65 is discontinued if a signal is being delivered through the terminal 42, the flip-flop circuit element will function in the manner hereinbefore described to reestablish an output across the terminals 40 and 41. If the delivery of a signal at terminal 42 has been discontinued then the flip-flop circuit element will remain dormant until a signal is received at 42.

The foregoing description sets forth a flip-flop circuit element for use in a control system that gives an operator complete control so that he may interrupt the delivery of an output or the restoring of an output as desired.

Since certain changes may be made in the above construction and different embodiments of the invention could be made without departing from the scope thereof, it is intended that all matter contained in the above description or shown in the accompanying diagram shall be interpreted as illustrative and not in a limiting sense.

I claim as my invention:

1. In a flip-flop element of a control system, in combination a plurality of cores, a plurality of windings on each core, a source of power, a reset circuit connecting one winding of each core to the source of power, a gating circuit connecting one winding of each core to the source of power, the gating circuits and reset circuits being so connected that they function to drive the cores to positive and negative saturation alternately, means for delivering a signal to the reset circuits to block their functioning and the driving of the cores to negative saturation, the gating circuits then serving to build up an output voltage capable of performing a predetermined function, and means for impressing a voltage across the third coil of each core to drive the cores to negative saturation to interrupt the output voltage, said means functioning to interrupt the output voltage irrespective of whether or not the signal received and which blocks the reset circuits continues to be received.

2. In a flip-flop element of a control system, in combination a plurality of cores, a plurality of independent windings on each core, a reset circuit connecting one winding of each core of the source of power, a gating circuit connecting another winding of each core to the source of power, the reset and gating circuits being so connected that they drive the cores to positive and negative saturation alternately, output terminals connected in circuit relationship with the gating circuits for delivering an output, means for delivering a signal to the reset circuits to block their functioning as reset circuits, and means for delivering a signal to a third coil on each core to drive the cores to negative saturation irrespective to the magnetic conditions prevailing in the cores when the signal is received to interrupt an output.

3. In a flip-flop element of a control system, in combination a plurality of cores, a plurality of independent windings on each core, a reset circuit connecting one winding of each core to the source of power, a gating circuit connecting another winding of each core to the source of power, the reset and gating circuits being so connected that they function to drive the cores to positive and negative saturation alternately, output terminals connected in circuit relation with the gating circuit for delivering an output, means for delivering a signal to a third winding of each core to drive it to negative saturation, and a non-linear device connected in circuit relationship with the means for delivering the signal to the third coil on each core to control the amount of current flow.

4. In a flip-flop element of a control system, in combination a plurality of cores, a plurality of independent windings on each core, a reset circuit connecting one winding of each core to the source of power, a gating circuit connecting another winding of each core to the source of power, the reset and gating circuits being so connected that they drive the cores to positive and negative saturation alternately, output terminals connected in circuit relationship with the gating circuits for delivering an output, a plurality of circuits for delivering a signal to a third winding on each core, and a non-linear device connected in circuit relationship with each of the circuits for the third winding, the third windings on the cores being so disposed that when the signal is received they drive the core to negative saturation to interrupt the output at the output terminals.

No references cited.